United States Patent [19]

Seo

[11] Patent Number: 5,136,393
[45] Date of Patent: Aug. 4, 1992

[54] BUILT-IN DC LIGHT FOR CAMCORDER

[75] Inventor: Un S. Seo, Suwon, Rep. of Korea

[73] Assignee: Goldstar, Co., Ltd., Rep. of Korea

[21] Appl. No.: 590,009

[22] Filed: Sep. 28, 1990

[30] Foreign Application Priority Data

Oct. 31, 1989 [KR] Rep. of Korea ............... 89-15961

[51] Int. Cl.$^5$ .................. H04N 5/76; H04N 5/225
[52] U.S. Cl. .................. 358/335; 358/906; 358/909
[58] Field of Search .......... 358/906, 909, 335; 382/3, 376, 362, 283, 247, 248, 371, 431, 434

[56] References Cited

U.S. PATENT DOCUMENTS

| 4,320,439 | 3/1982 | Wiley | 362/3 |
| 4,384,319 | 5/1983 | Blaisdell et al. | 362/16 |
| 4,554,621 | 11/1985 | Corrigan | 362/3 |
| 4,625,243 | 11/1986 | Takubo | 358/906 |
| 4,777,566 | 10/1988 | Lowell et al. | 362/18 |
| 4,924,246 | 5/1990 | Yamada | 358/906 |
| 4,959,755 | 9/1990 | Hochstein | 362/5 |

FOREIGN PATENT DOCUMENTS 2123539A  2/1984  United Kingdom ............. 362/3

Primary Examiner—Roy N. Envall, Jr.
Assistant Examiner—Thai Tran
Attorney, Agent, or Firm—Anthony J. Casella; Gerald E. Hespos

[57] ABSTRACT

A built-in light for camcorder is disclosed, and this built-in light includes a hand grip case, a light assembly installed within the hand grip case, and a means for controlling the light assembly. The light assembly includes: a holder ring for securing the light assembly; a protecting glass ring for being coupled with the holder ring; a reflecting mirror for being secured to the back of the holder ring; a socket for being secured to the rear end of the reflecting mirror; and a DC lamp for being secured to the socket. The device of the present invention eliminates the need for carrying and keeping a separate light.

8 Claims, 3 Drawing Sheets

5,136,393

BUILT-IN DC LIGHT FOR CAMCORDER

FIELD OF THE INVENTION

The present invention relates to a built-in DC light installed on a camcorder for use in filming-photographing, and particularly to a built-in DC light for Video Movie Camera (hereafter camcorder), which is suitable as a substitute for a separate light, when photographing in a dark room, and in which the inconvenience of installing a light at site and keeping the light separately after the photographing is removed.

BACKGROUND OF THE INVENTION

As shown in FIGS. 1 and 2, the conventional light for a camcorder, which is necessarily used when photographing in a dark room or in an insufficiently illuminated room, is constituted such that: a guide rail 2 is secured on an upper surface 4a of carrying handle 4 of a camcorder by means of a screw 3; upon encountering the need for use of the light, a light body 1 is installed on the camcorder by fitting a guide shoe 1a of the light body 1 to the guide rail 2 in the direction of the arrow mark; and a shifting switch which is disposed on the back of the light body is used for turning on or off. The light installing structure described above requires a separate light and the installing means, as well as has to be attached to the handle, and therefore, an inconvenience is accompanied when moving to another place, in addition to the inconvenience of keeping the light in a separate manner.

SUMMARY OF THE INVENTION

The present invention is intended to overcome the above described disadvantages of the conventional device.

Therefore, it is the object of the present invention to provide an internal DC light for a camcorder, in which a DC light is stored within the hand grip of the camcorder, thereby assuring a convenience in handling and using the light.

BRIEF DESCRIPTION OF THE DRAWINGS

The above objective and other advantages of the present invention will become more apparent by describing in detail the preferred embodiment of the present invention with reference to the attached drawings in which.

DESCRIPTION OF THE PREFERRED EMBODIMENT

Figure 1:
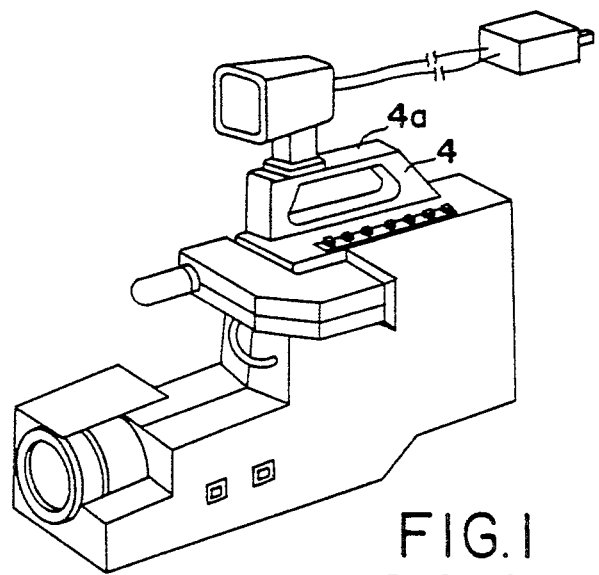
FIG. 1 is a perspective view showing a conventional DC light installed on a conventional camcorder.
Figure 2:
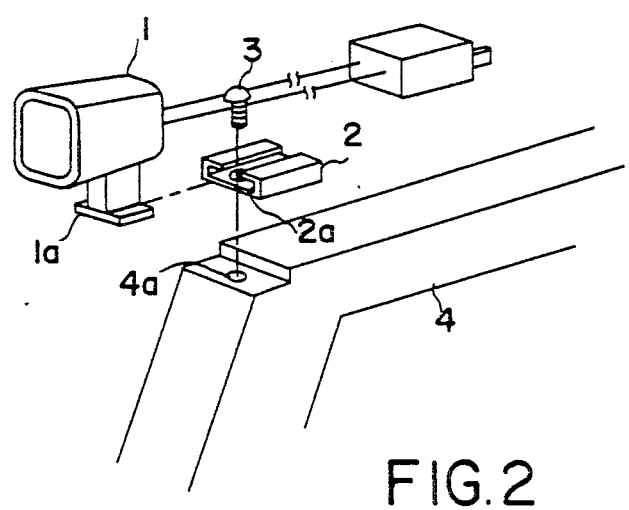
FIG. 2 is an exploded perspective view of the installing structure of the conventional DC light.
Figure 3:
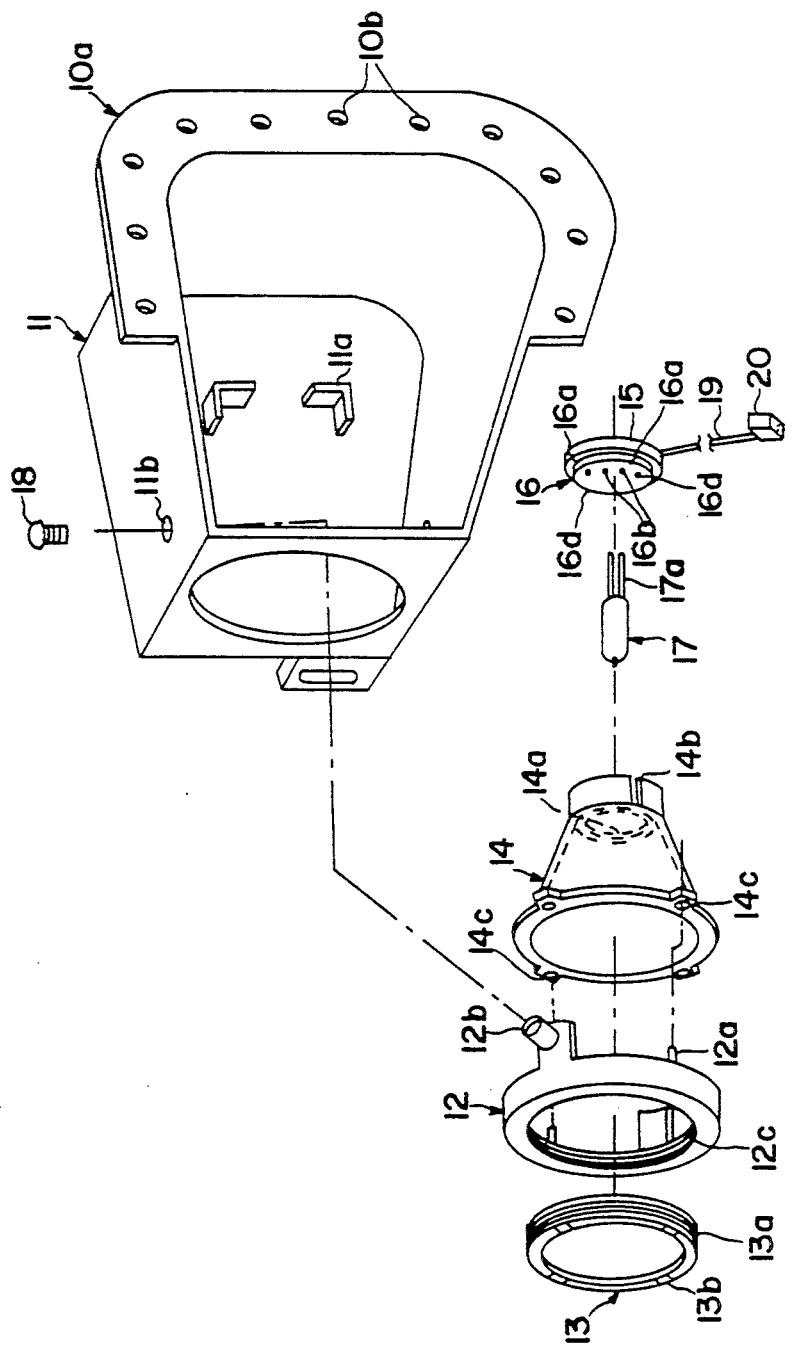
FIG. 3 is an exploded perspective view of the internal storing means for the built-in DC light for camcorder according to the present invention.
Figure 4:
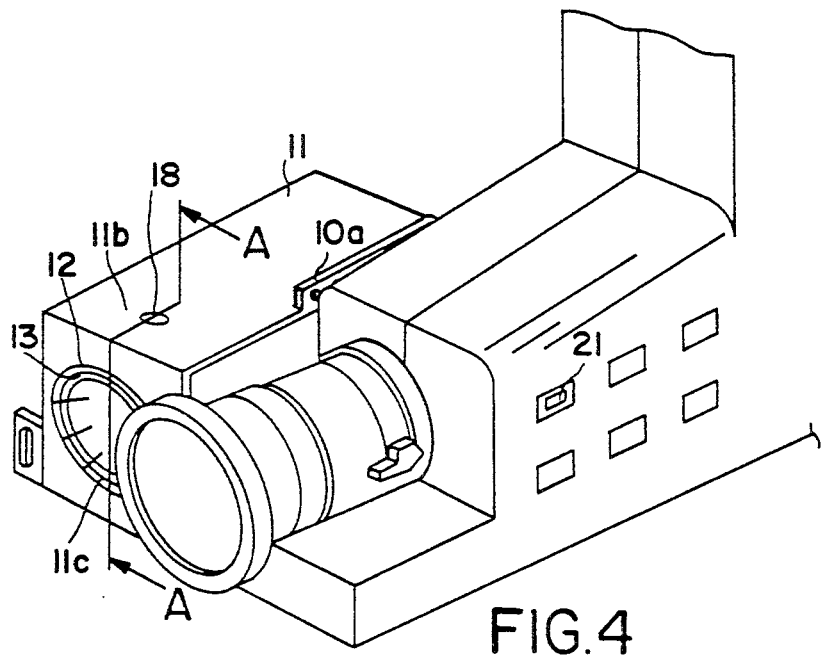
FIG. 4 is a perspective view of the assembled state of the DC light according to the present invention.

FIG. 3 is an exploded perspective view of the installing means for the DC light for a camcorder according to the present invention, and FIG. 4 is a perspective view of the assembled state of the DC light according to the present invention. As shown in these drawings, a hole 11c is formed on the front face of a hand grip case 11 which is attached to a side of the camcorder body 10 by a mounting flange 10a having through-holes 10b for receiving fasteners; threaded through-holes 11b are formed above and below the hole 11c; and two stopper ribs 11a are projected from the bottom of the interior so as for the ribs to face each other. A holder ring 12 is provided in the same size as that of the hole 11c so as for it to be installed within the hole 11c, and on the inside of the holder ring 12, there are formed screw threads 12c. Securing bosses 12b are projected from the holder ring 12 at an angular interval of 180 degrees, light position securing protrusion 12a are projected backwardly on the circumferential surface of the holder ring. A protecting glass ring 13 on which a protecting glass is installed is provided with threads 13a on the outer circumferential surface thereof, and the threads 13a are coupled with the threads 12c of the holder ring 12. A reflecting mirror 14 is coupled to the back side of the holder ring 12, and insertion holes 14c are formed on the circumferential surface of the reflecting mirror 14, so that the holes 14c can be coupled with the protuberances 12i a of the holder ring 2, thereby setting the reflecting mirror 14 at the correct position in any easy manner.

The reflecting mirror 14 is tapered in the rearward direction like a funnel, and the rear end portion of the reflecting mirror 14 is provided with a slit 14b, so that a side protuberance 16a of a reflecting plate 16 should be coupled with the slit 14b, when a socket 15 is fitted to the reflecting mirror 14.

Figure 5:
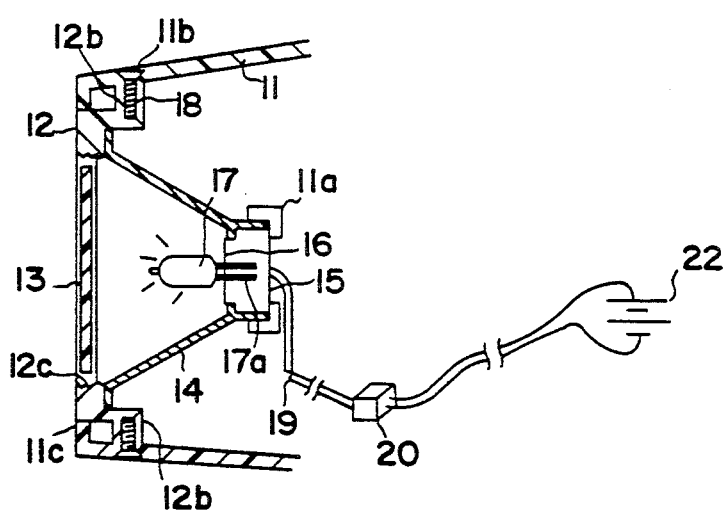
FIG. 5 is a sectional view taken along the line A—A of FIG. 4.

Thus, the slit 14b of the reflecting mirror 14 and the side protuberance 16a play the role of correctly positioning the socket 15, and a stopper 14a is provided on the inside of the rear end portion of the reflecting mirror 14 so that the socket 15 should be kept from being excessively inserted. A reflecting plate 16 is attached on the front face of the socket 15 which is coupled with the rear end portion of the reflecting mirror 14, and lamp securing holes 16b is formed at the centre of the reflecting plate 16, while holes 16d for securing the reflecting plate are formed outwardly from the lamp securing holes 16b. The components constituted as above can be assembled as shown in FIG. 5 in such a manner that: a DC light lamb 17 is fitted to the securing holes 16b of the socket 15 by means of leads 17a, in a state with a connector 20 and a connecting cord 19 connected to a power source 22; and the socket 15 is inserted into the rear end portion of the reflecting mirror 14 so as for the side protuberance 16a of the reflecting plate 16 to be coupled with the slit 14b of the rear end portion of the reflecting mirror 14, thereby completing the coupling between the reflecting mirror 14 and the socket 15. Then, the holder ring 12 is inserted into the hole 11c of the hand grip case 11, and a fastening is made by means of the bosses 12b by driving screws 18 into the upper and lower threads holes 11b. Then, the protuberances 12a of the holder ring 12 are fitted into the holes 14c which are formed on the reflecting mirror 14 in the upward, downward, leftward and rightward directions, and a further insertion is made to such a state that the rear end portion of the reflecting mirror 14 should be firmly coupled with the ribs 11a of the hand grip case 11. Thereafter, if the protecting glass ring 13 is assembling into the thread portion 12c of the holder rings 12, the assembling of the light structure is completed.

In this state, if the connector 20 is connected to a DC power source 22 (a DC battery pack), filming-photographings become possible, and a power source for the lighting can be let to flow to the camcorder deck and to the camera operating PCB, while the power source may be turned on and off by means of a power switch 21 which is externally provided.

According to the present invention as described above, the light is installed within the hand grip of the camcorder so as for a separate light to be needless, while film-photographing is possible at a place where there is no. AC power source because a DC power source is stored. Further, when the lamp is to be replaced, the lamp 17 is separated by threadably detaching the protecting glass ring through manipulations of the protuberances 13b, and then, a new lamp is placed before, re-assembling the protecting glass ring. Therefore the use and handling of the light becomes very convenient.

What is claimed is:

1. In combination, a hand grip and a built-in light for a camcorder, said camcorder having a front face, a rear face and a plurality of side faces extending between said front and rear faces, an internal power source for powering the camcorder, said combination of a hand grip and built-in light comprising: a hand grip case for gripping the camcorder during use, said hand grip case rigidly connected to one of said side faces of said camcorder and formed with a hole for radiating light from the front face of the camcorder; a light assembly wholly disposed within said hand grip case; and a means for connecting said light assembly to the internal power source of the camcorder.

2. A built-in light for a camcorder as claimed in claim 1, wherein said means for connecting said light assembly to the internal power source comprises: a connecting line connected to a terminal of said light assembly; a connector for connecting said connecting line to the internal power source of the camcorder; and a switching means mounted to one said face of said camcorder for turning on/off said light assembly.

3. A built-in light for a camcorder as in claim 1, wherein said light assembly includes a socket and a lamp removably connected to said socket, said built-in light further comprising a protecting glass removably mounted to the front face of the camcorder for covering the light radiating hole therein, whereby the removability of the protective glass provides access to the lamp.

4. A built-in light for a camcorder as in claim 1, wherein the plurality of side faces of said camcorder comprises a bottom wall, a top wall and a pair of opposed side walls, said hand grip case being disposed on one said side wall of the camcorder.

5. A built-in light for a camcorder as in claim 4, wherein the hand grip case is disposed on a portion of one said side wall in proximity to the front face of the camcorder.

6. A built-in light for a camcorder as in claim 1, wherein the hand grip case comprising a mounting flange for mounting the hand grip case on the said side face of said camcorder.

7. A built-in light for a camcorder as in claim 1, wherein the means for connecting said light assembly to the internal power source of the camcorder is disposed internally with respect to the hand grip case and the front, rear and said faces of the camcorder.

8. A built-in light for a camcorder having a front face, a rear face and a plurality of side faces extending therebetween, an internal power source for powering the camcorder, said built-in light comprising a hand grip case for gripping the camcorder during use rigidly disposed on one said side face of said camcorder and formed with a hole for radiating light from the front face of the camcorder; a light assembly mounted in the hand grip case and including a threaded holder ring for securing said light assembly into the light radiating hole, said holder ring having a plurality of protrusions extending backwardly thereon; a protecting glass ring threadably coupled to the holder ring; a reflecting mirror secured to said plurality of protrusions on said holder ring and having at least one slit thereon; a socket having at least one protuberance formed thereon for meshing with the slit of the reflecting mirror, a D.C. lamp removably secured to the socket; and an electrical connector connected to the socket and to the internal power source of the camcorder.

* * * * *